(12) United States Patent
Schmale

(10) Patent No.: US 10,987,866 B2
(45) Date of Patent: Apr. 27, 2021

(54) REMOVING BUILD MATERIAL

(71) Applicant: HEWLETT-PACKARD DEVELOPMENT COMPANY, L.P., Spring, TX (US)

(72) Inventor: Joshua Ryan Schmale, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/452,286

(22) Filed: Jun. 25, 2019

(65) Prior Publication Data
US 2020/0406545 A1 Dec. 31, 2020

(51) Int. Cl.
| | |
|---|---|
| *B29C 64/35* | (2017.01) |
| *B33Y 40/00* | (2020.01) |
| *B33Y 30/00* | (2015.01) |
| *B29C 64/245* | (2017.01) |
| *B08B 5/04* | (2006.01) |
| *B08B 7/04* | (2006.01) |
| *B08B 7/02* | (2006.01) |

(52) U.S. Cl.
CPC ............... *B29C 64/35* (2017.08); *B08B 5/04* (2013.01); *B08B 7/02* (2013.01); *B08B 7/04* (2013.01); *B29C 64/245* (2017.08); *B33Y 30/00* (2014.12); *B33Y 40/00* (2014.12)

(58) Field of Classification Search
CPC ......... B29C 64/35; B29C 64/245; B08B 7/02; B08B 7/04; B33Y 30/00; B33Y 40/00
See application file for complete search history.

(56) References Cited

U.S. PATENT DOCUMENTS

| | | | |
|---|---|---|---|
| 10,065,270 B2 | 9/2018 | Buller et al. | |
| 10,195,693 B2 | 2/2019 | Buller et al. | |
| 2002/0090410 A1* | 7/2002 | Tochimoto | B33Y 30/00 425/215 |
| 2005/0275129 A1* | 12/2005 | Sambu | A61C 13/0013 264/113 |
| 2011/0204094 A1 | 8/2011 | Meckstroth et al. | |
| 2015/0314373 A1* | 11/2015 | Mironets | B22F 3/003 419/30 |
| 2017/0072466 A1 | 3/2017 | Zehavi et al. | |
| 2017/0120332 A1 | 5/2017 | Demuth et al. | |
| 2017/0129167 A1* | 5/2017 | Castanon | B29C 64/124 |
| 2018/0214984 A1* | 8/2018 | Haro Gonzalez | B29C 64/153 |
| 2018/0297296 A1* | 10/2018 | Schwerdtfeger | B33Y 10/00 |
| 2019/0039367 A1* | 2/2019 | Roman | B08B 5/04 |
| 2019/0077083 A1 | 3/2019 | Chanclon et al. | |
| 2019/0240913 A1* | 8/2019 | Jordan | B29C 64/165 |
| 2020/0055250 A1* | 2/2020 | Vodermair | B29C 64/393 |
| 2020/0164466 A1* | 5/2020 | Sievers | B29C 64/153 |
| 2020/0166482 A1* | 5/2020 | Gold | G01N 29/30 |

* cited by examiner

*Primary Examiner* — Nahida Sultana
(74) *Attorney, Agent, or Firm* — HP Inc. Patent Department

(57) ABSTRACT

A system includes a build platform having a bottom surface and a top surface. A plurality of apertures receives the build material on the build platform. A vibration generator is coupled to the build platform to vibrate the build platform and move the build material on the build platform. An air handler applies airflow to the build platform in a first airflow mode and a second airflow mode. In the first airflow mode, the build material from the build platform is removed through the plurality of apertures.

12 Claims, 11 Drawing Sheets

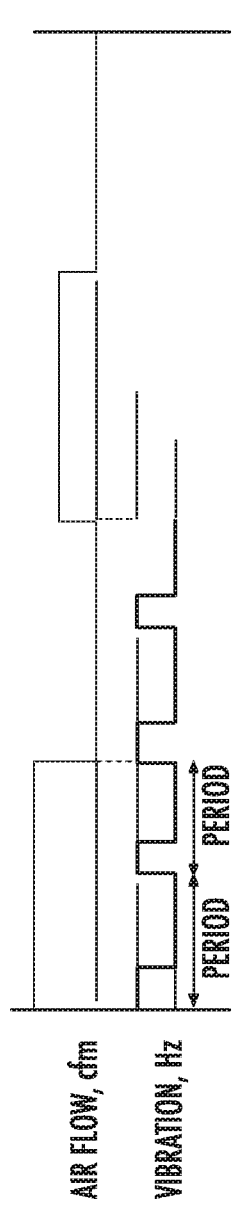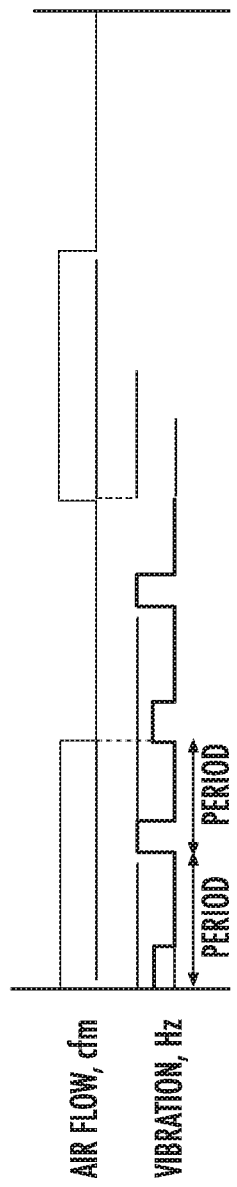

REMOVING BUILD MATERIAL

BACKGROUND

Some three-dimensional (3D) printers deposit successive layers of a build material (e.g., a nylon powder, a metal powder, etc.) and fuse or bond selected portions of the build material for each layer by applying energy, such as electromagnetic energy, or a reactant, such as a binder, to the layer of the build material. This assembly process continues, layer-by-layer, until the entire 3D product is completed. When the 3D product is complete, unused build material that is not fused or bonded which that does not form the printed product, may be removed, reclaimed and recycled.

BRIEF DESCRIPTION OF THE DRAWINGS

FIGS. 8A-8B are examples of a timing cycle for the vibration and airflow of the build platform.

DETAILED DESCRIPTION

Figure 1:
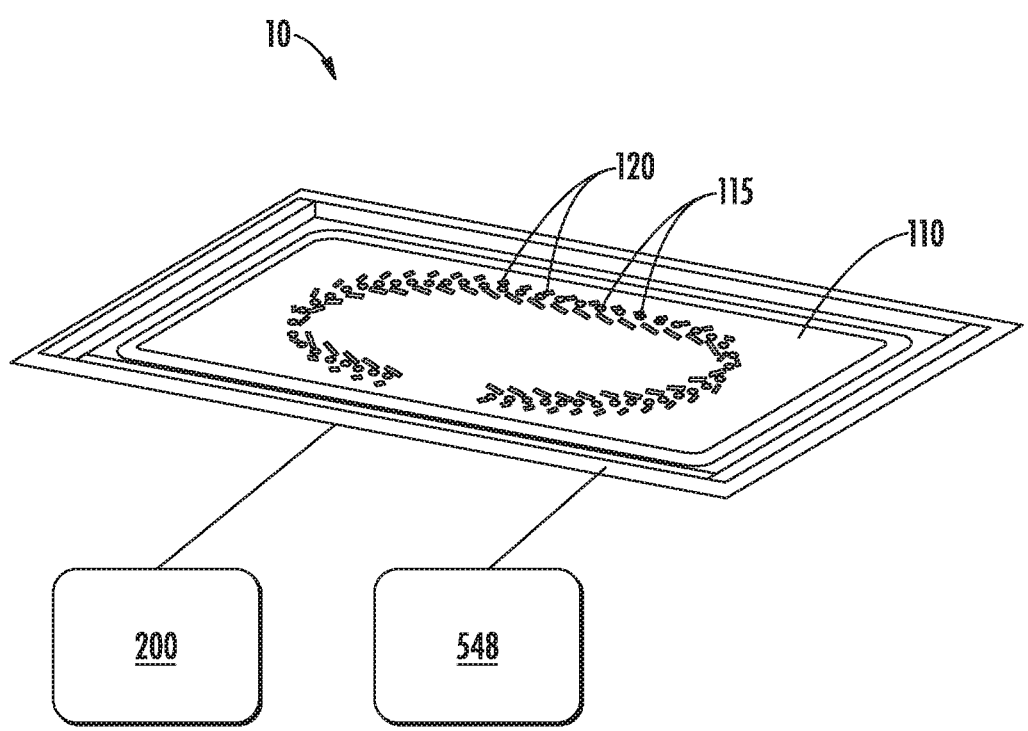
FIG. 1 is a schematic of an example system.

Unused, unfused build material remaining after completion of a 3D printing process may be removed and reclaimed after printing a 3D object or workpiece. After the 3D printing process, non-solidified build material may remain in the build chamber. The non-solidified build material may be in, for example, powder form which is unfused. Although some of the build material remaining may be non-solidified, the build material may have been slightly affected by the printing processes performed during generation of the 3D object. For example, such build material may be more cohesive with agglomerations of particles often referred to as chunks. FIG. 1 is a schematic of an example system 10. The system 10 is used to remove unused build material. The system 10 includes a build platform 110 having a bottom surface and a top surface. A plurality of protrusions 120 extend from the top surface of the build platform 110 to assist in the separation of chunks of build material on the build platform 110. A plurality of apertures 115 receive the build material on the build platform 110. A vibration generator 200 is coupled to the build platform 110 to vibrate the build platform 110 and move the build material on the build platform 110. In one example, an air handler 548 applies airflow to the build platform 110 in a first airflow mode and a second airflow mode. In the first airflow mode, the build material from the build platform 110 is removed through the plurality of apertures 115. In the second airflow mode, the build material is moved away from the plurality of apertures 115 on the build platform 110. In some examples, the plurality of protrusions 120 may be omitted.

Figure 2:
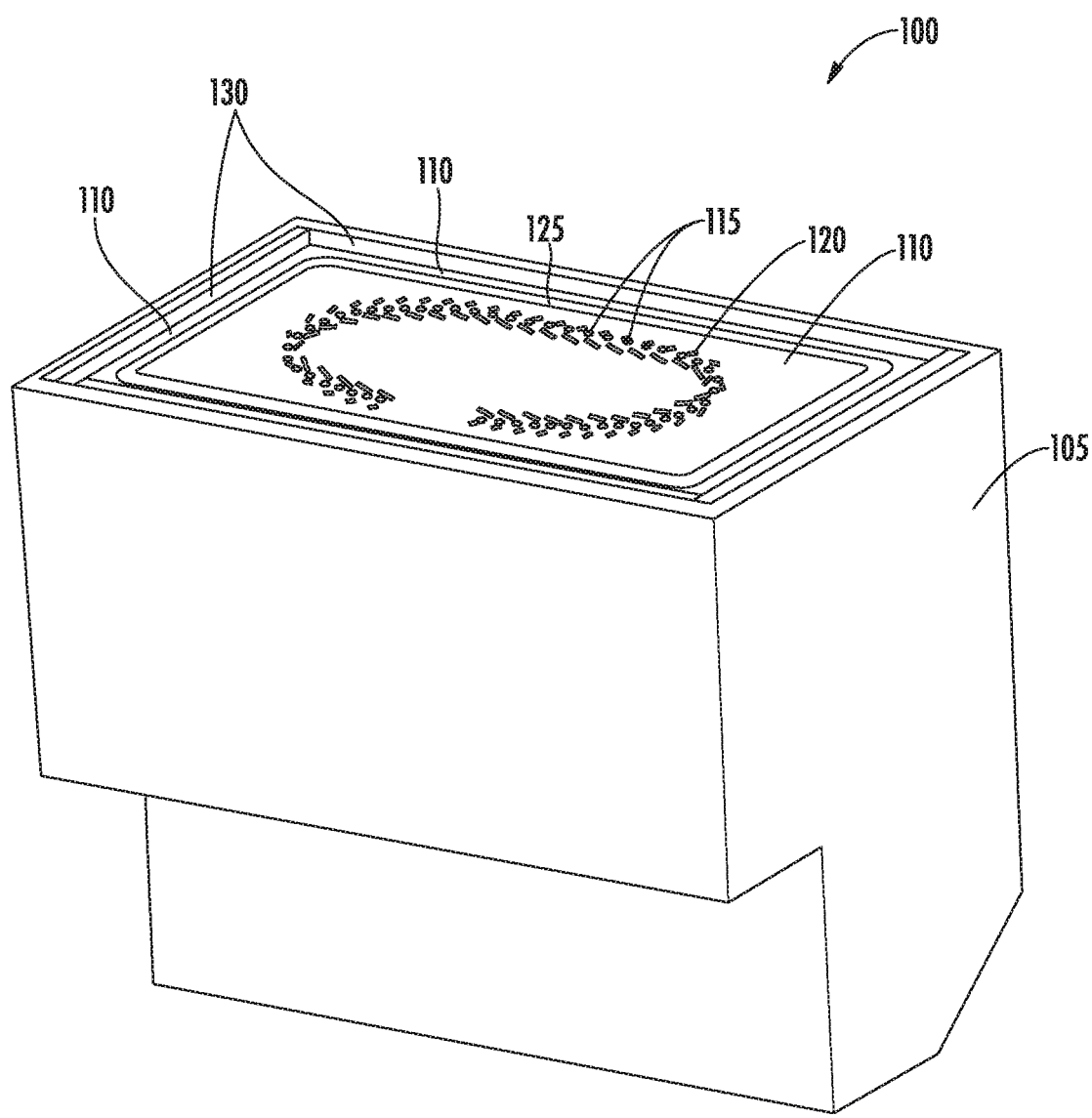
FIG. 2 is a rear perspective view of an example build unit.

FIG. 2 is a rear perspective view of an example build unit 100. The build unit 100 includes a housing 105 and a build platform 110. In some examples, the build unit 100 may be implemented with a 3D printer or be integral with the 3D printer. The build platform 110 has a bottom surface and a top surface and includes a plurality of apertures 115. The plurality of apertures 115 are used to remove unused, non-solidified build material from the build platform 110 that does not form the printed workpiece after a 3D print job has been processed. The plurality of apertures 115 in the build platform 110 also provides a pathway for gas and build material to move from the top surface of the build platform to a chamber coupled to the bottom surface of the build platform 110.

In some examples, the plurality of apertures 115 are arranged in a pattern, an array, randomly, or in another arrangement and may be substantially similar in size or may include two or more different sizes. Additionally, a spacing between neighboring apertures 115 may be uniform or dissimilar. The plurality of apertures 115 are arranged in a generally ovoid shape with a diameter of about 2 mm (+/−0.1 mm) and a spacing between the neighboring apertures 115 is not uniform.

Figure 3A:
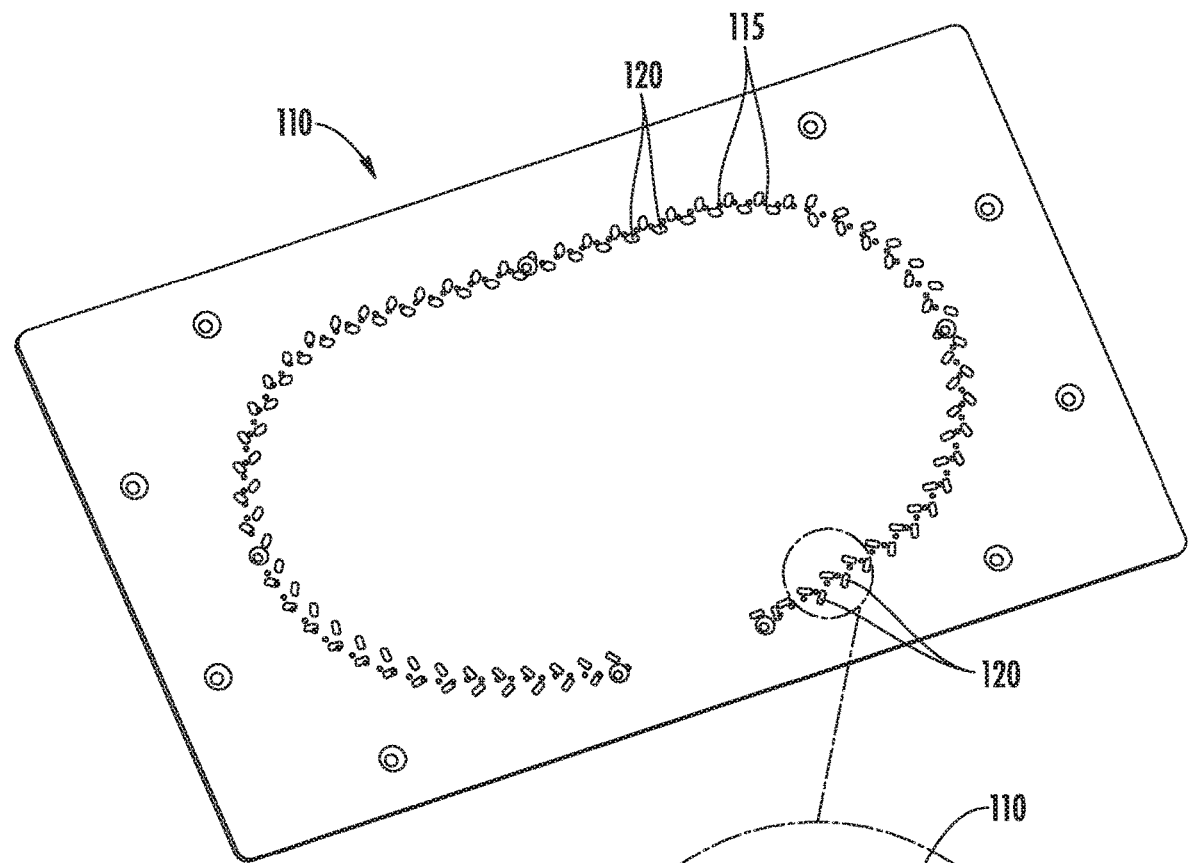
FIG. 3A depicts a perspective view of the build platform with an example of the plurality of protrusions.
Figure 3B:
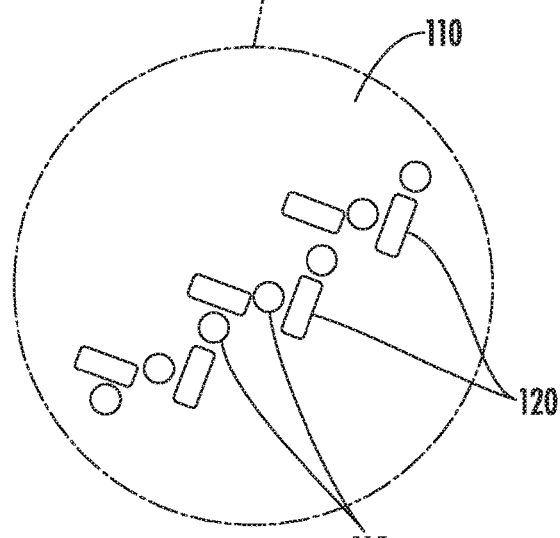
FIG. 3B is a close-up view of a portion of FIG. 3A showing the example of the plurality of protrusions.

In some examples, the build platform 110 includes a plurality of protrusions 120 extending from the top surface of the build platform 110 to separate chunks of build material on the build platform 110. FIG. 3A depicts a perspective view of the build platform with an example of the plurality of protrusions. FIG. 3B is a close-up view of a portion of FIG. 3A showing the example of the plurality of protrusions 120. The plurality of protrusions 120 are arranged in a pattern, an array, randomly, or in another arrangement and may be substantially similar in size or may include two or more different sizes. Each protrusion of the plurality of protrusions 120 may be spaced apart from one another, and located between neighboring apertures of the plurality of apertures 115. In some examples, each protrusion of the plurality of protrusions 120 are located near an aperture of the plurality of apertures 115 such as within 1 to 4 mm. In some examples, each protrusion of the plurality of protrusions 120 is larger than the aperture of the plurality of apertures 115.

The shape of each protrusion of the plurality of protrusions 120 may be linear, curvilinear, serpentine, circular and/or semicircular shape, elliptical, circular, or a ridge, and have tapered or angled edges. In one example, each protrusion of the plurality of protrusions 120 may extend 1.5 mm to 3 mm or approximately 2 mm from the top surface of the build platform 110. In some examples, each protrusion of the plurality of protrusions 120 extends from the top surface of the build platform 110 by the same amount or height. In other examples, each protrusion of the plurality of protrusions 120 extends from the top surface of the build platform 110 by varying amounts of 1.5 mm to 3 mm. The diameter or length of each protrusion of the plurality of protrusions 120 may be 3.8 mm to 4.5 mm or, for example, 4 mm.

Figure 4A:
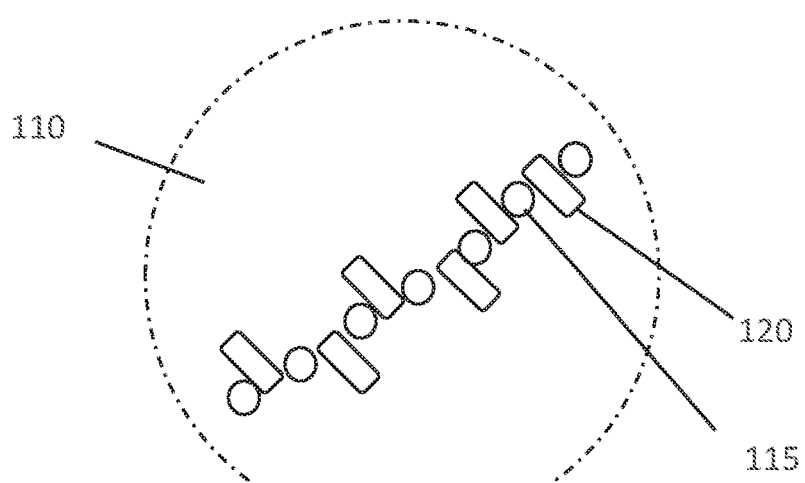
FIGS. 4A-4C illustrate example arrangements of the plurality of protrusions on the build platform.
Figure 4B:
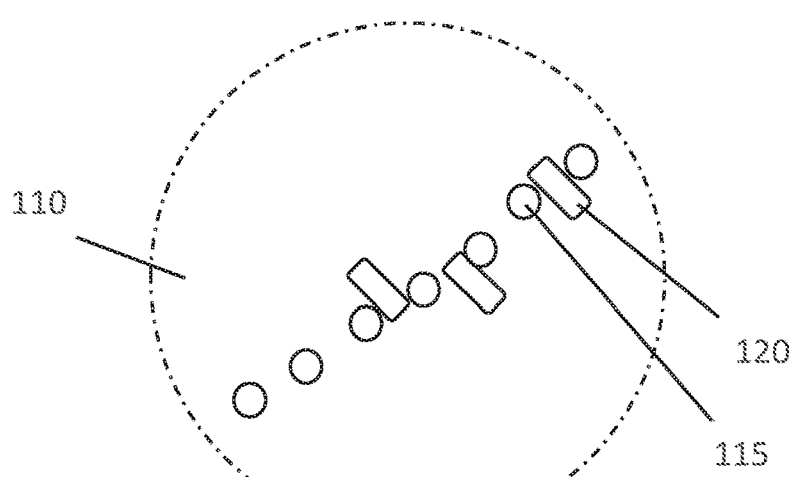
Figure 4C:
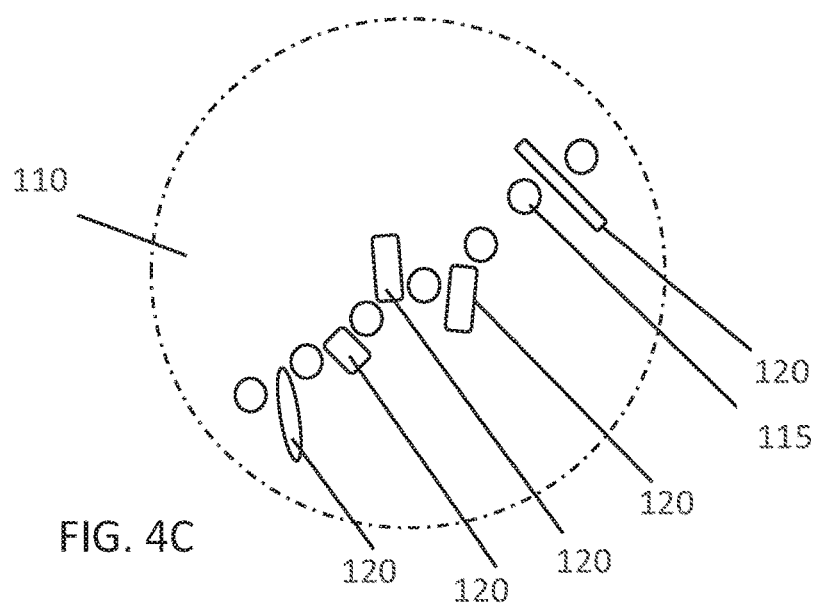

FIGS. 4A-4C illustrate example arrangements of the plurality of protrusions 120 on the build platform 110. In non-limiting examples, FIG. 4A depicts each protrusion of the plurality of protrusions 120 of similar size and shape, spaced apart from one another, in a repeating pattern between neighboring apertures of the plurality of apertures 115. FIG. 4B illustrates each protrusion of the plurality of protrusions 120 of similar size and shape, spaced apart from one another, in a non-repeating pattern between neighboring apertures of the plurality of apertures 115. FIG. 4C illustrates each protrusion of the plurality of protrusions 120 of a different size and shape from one another, spaced apart from one another, in a non-repeating pattern between neighboring apertures of the plurality of apertures 115.

In one example, the plurality of protrusions 120 are comprised of a non-rigid material including a polymer, silicone or synthetic rubber. The material selection may be a softer, more pliable material than the fused or bonded build material so that the printed workpiece is not damaged during the reclamation method when in the build area. In another example, the plurality of protrusions 120 are comprised of a rigid material including metal or plastic. The plurality of protrusions 120 may be the same material as the build platform 110.

In some examples, the build platform 110 is constructed to maintain a fixed horizontal attitude relative to the housing 105 throughout a range of vertical motion of the build platform 110. The build platform 110 may be constructed to tilt relative to the housing 105 (e.g., 1° relative to horizontal, 2° relative to horizontal, etc.) during a reclaiming and recycling operation to remove unused, non-solidified build material that does not form the printed.

A damping element 125 is disposed between the build platform 110 and lateral walls 130 of a build area to isolate, in whole or in part, the build platform 110 from the lateral walls 130, which are stationary relative to the build platform 110 when vibrating. In some examples, the damping element 125 is disposed about a periphery of the build platform 110 to form a buffer between the build platform 110 and the lateral walls 130. In some examples, the damping element 125 is disposed in the build platform 110 to isolate, in whole or in part, a first portion of the build platform 110 (e.g., an inner portion) from a second portion of the build platform 110 (e.g., an outer portion). In some examples, the damping element 125 includes a rubber (e.g., a Nitrile butadiene rubber (NBR), a silicone rubber compound, etc.) of a selected hardness (e.g., 45 Shore A, 60 Shore A, 70 Shore A, etc.). In other examples, the lateral edges of the build platform 110 are displaced from the lateral walls 130 of the build area of the build unit 100 and the damping element 125 includes a resilient sealing element matingly engaging the lateral walls 130.

Figure 5:
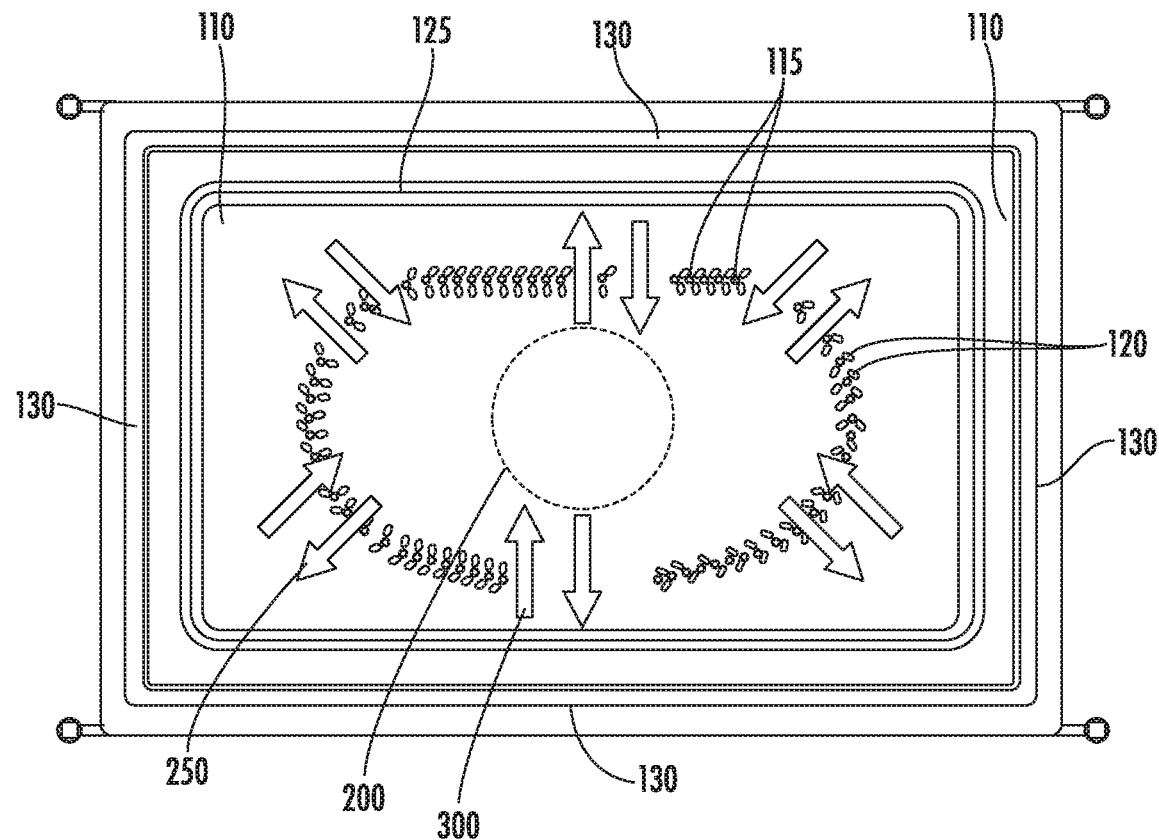
FIG. 5 is a top view of the build platform.

FIG. 5 is a top view of the build platform 110. The dashed lines illustrate an example vibration generator 200 coupled to the bottom surface of the build platform 110. After the printed workpiece is printed, build material that does not form the printed workpiece remains on the build platform 110. To aid in the removal of the leftover build material, the vibration generator 200 may apply vibration to the build platform 110 to move unused, non-solidified build material (e.g., powder) on the build platform 110 toward the plurality of apertures 115 through which the build material will be removed. Any number of vibration modes may used as defined by the frequency and duration of the mode. For example, a single vibration mode may be applied to the build platform 110, a first vibration mode and a second vibration mode, or more than two vibrations modes may be implemented.

For example, the vibration generator applies the first vibration mode to the build platform 110 to move unused, non-solidified build material on the build platform 110 in a first direction such as outwardly in a direction indicated by the arrows 250. The vibration generator 200 may also apply the second vibration mode to the build platform 110 to move the build material on the build platform 110 in a second direction such as an inward direction indicated by the arrows 300. In some examples, the unused, non-solidified build material on the build platform 110 is moved in a first direction, outwardly, as indicated by the arrows 250, and in a second direction, inward, as indicated by the arrows 300, in a single vibration mode to the build platform 110. The direction in which the build material is moved such outwardly toward a periphery of the build platform 110, or inwardly toward a central portion of the build platform 110, may be selectable via the vibration mode.

The vibration modes are implemented subsequent to a completion of a 3D printing operation to facilitate a reclaiming and recycling method. In some examples, the recycling method includes an application of a single vibration mode, or the first vibration mode followed by the second vibration mode, or alternately applying the first vibration mode and the second vibration mode. For example, the vibration generator 200 may apply a single vibration mode for a particular duration to the build platform 110 in an alternating manner with pauses, or may apply a continuous vibration mode without pauses, or repeatedly apply the first vibration mode, the second vibration mode and to the build platform 110 in an alternating manner with pauses between the first vibration mode, the second vibration mode.

In some examples, the vibration generator 200 includes a mechanical shaker, such as a brushless DC motor with an eccentric mass to impart vibration. For example, the vibration generator 200 may include a Model DIA42B20W32A, 20-watt brushless DC motor with an eccentric mass manufactured by MinebeaMitsumi Inc. of Japan. In some examples, the vibration generator 200 includes an electrodynamic shaker, such as a piezo-shaker or an electromagnetic-shaker. In other examples, the vibration generator 200 includes one or more vibration generators 200. Each vibration generator 200 may apply particular vibration modes such as a first vibration generator to produce the first vibration mode and a second vibration generator to produce the second vibration mode.

In some examples, the vibration generator 200, in the single vibration mode, vibrates the build platform 110 at one or more frequencies in a range of frequencies. For example, the range of frequencies may be between about 53 Hz (e.g., +/−1 Hz) to about 57 Hz (e.g., +/−1 Hz) or a subset of frequencies therebetween such as 55 Hz.

The vibration generator 200, in the single vibration mode, may vibrate the build platform 110 at one or more of the frequencies in the range of frequencies over a duration between about 5-15 seconds. The vibration generator 200 may pause the application of vibration to the build platform 110 for up to about 20 seconds. For example, the vibration mode includes vibration at about 55 Hz for a duration of about 10 seconds (e.g., +/−0.1 seconds). This enables the leftover build material that does not form the printed workpiece to move on the build platform 110 in a first direction and in a second direction (as shown by the arrows 250 and arrows 300 in FIG. 5) toward the extraction points, the plurality of apertures 115. Some of the build material may be slightly cohesive and in chunks. When the chunky build material contacts the plurality of protrusions 120 near the plurality of apertures 115, the chunks of build material are separated by the plurality of protrusions 120. The vibration generator 200 may be paused for 10 seconds between cycles of the vibration mode of 10 seconds.

In some examples, the vibration generator 200, in the first vibration mode, vibrates the build platform 110 at one or more frequencies in a first range of frequencies and the vibration generator 200, in the second vibration mode, vibrates the build platform 110 at one or more frequencies in a second range of frequencies different than the first range of frequencies. In some examples, the first range of frequencies is between about 20 Hz (e.g., +/−1 Hz) to about 50 Hz (e.g., +/−1 Hz) or a subset of frequencies therebetween. In some examples, the second range of frequencies is between about 55 Hz (e.g., +/−1 Hz) to about 150 Hz (e.g., +/−1 Hz) or a subset of frequencies therebetween. For instance, the vibration generator 200 is to vibrate, in the first vibration mode, at about 40 Hz and is to vibrate, in the second vibration mode, at about 65 Hz. In some examples, the frequency in the first vibration mode is less than the frequency in the second vibration mode.

In some examples, the vibration generator 200, in the first vibration mode, vibrates the build platform 110 at one or more of the frequencies in the first range of frequencies over a first period between about 1-10 seconds. Subsequent to the first vibration mode, the vibration generator 200, in the second vibration mode, vibrates the build platform 110 at one or more of the frequencies in the second range of frequencies over a second period between about 1-10 seconds. In some examples, the vibration generator 200 pauses the application of vibration to the build platform for up to about 5 seconds between the first vibration mode and the second vibration mode. In some examples, the vibration generator 200 transitions between the first vibration mode and the second vibration mode without pause.

For instance, the first vibration mode includes vibration at about 40 Hz for a duration of about 2 seconds (e.g., +/−0.1 seconds) to move unused, non-solidified build material on the build platform 110 in the first direction toward the plurality of apertures 115, as shown by the arrows 250 in FIG. 5, followed by a pause of about 4 seconds. The second vibration mode includes vibration at about 65 Hz for a duration of about 6 seconds (e.g., +/−0.1 seconds) to move the unused, build material on the build platform 110 in the second direction toward the plurality of apertures 115, as shown by the arrows 300 in FIG. 5, followed by a pause of about 2 seconds. The plurality of protrusions 120 separate cohesive or chunks of unused, non-solidified build material so the build material may be reduced to fit within the plurality of apertures 115 during removal.

The vibration modes may be tuned responsive to characteristics of the build material and/or bulk build material (e.g., powder static properties, powder dynamic properties, powder flowability, powder shape and aspect ratio, powder morphology, powder uniformity, powder size, layer density, etc.). Thus, in some examples, characteristics of the vibration modes such as frequency, duration, or the like, and/or characteristics of combinations of the first vibration mode and the second vibration mode (e.g., holding a first vibration mode constant while implementing variations to a second vibration mode, etc.) are varied and observed with respect to a particular build material and a particular workpiece of interest on the build platform 110. Similar to determining a system resonance, this enables determination of a suitable vibration mode such as a single vibration mode or a combination of the first vibration mode and the second vibration mode to move the build material on the build platform 110 and in some examples, break-up chunks of the build material on the build platform 110 via the plurality of protrusions 120 to facilitate reclaiming and recycling of the build material, such as via the plurality of apertures 115.

Figure 6:
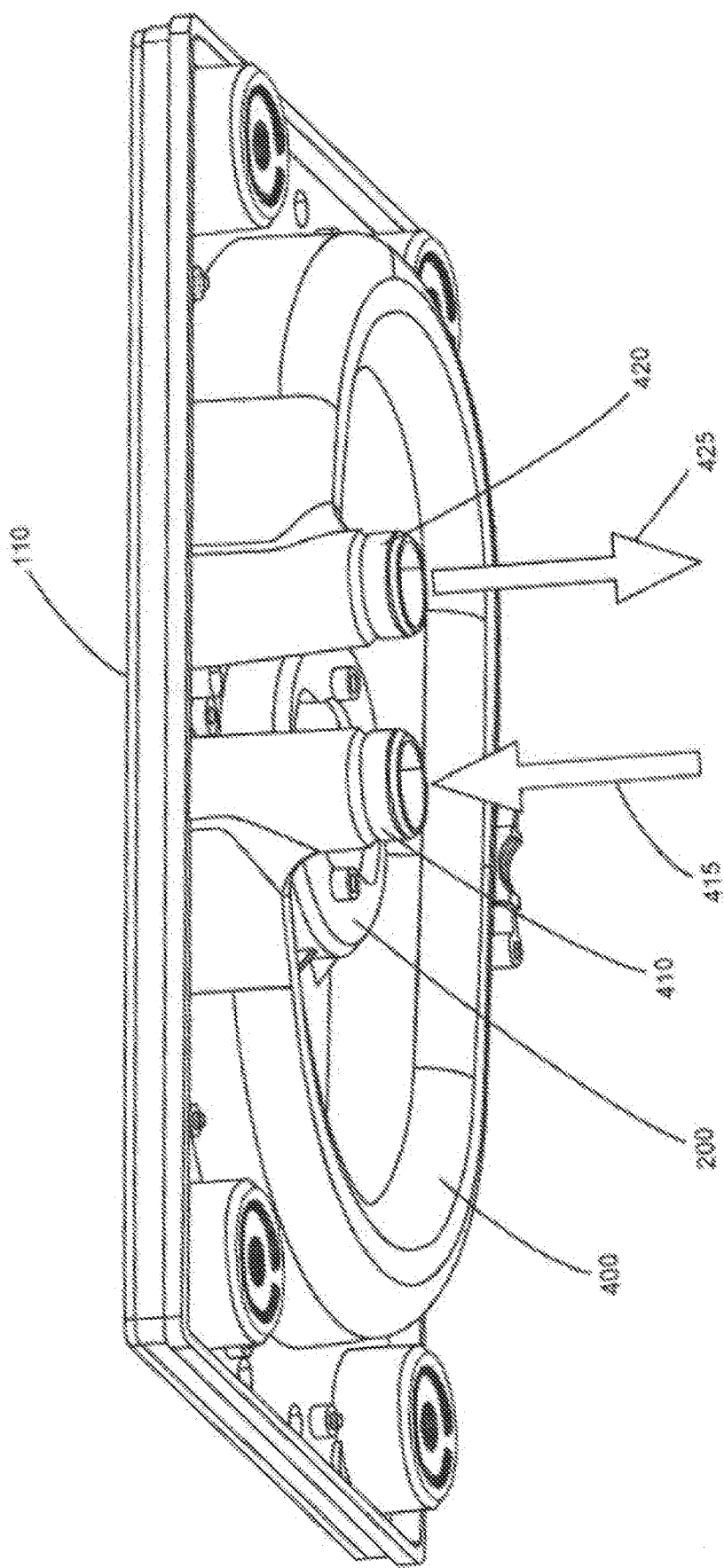
FIG. 6 is a bottom perspective view of the example build platform.

FIG. 6 is a bottom perspective view of the example build platform 110. The bottom surface of the build platform 110 includes an example chamber 400 that is connected to an air handler 548 (not shown; see FIG. 7) via an example flow inlet 410 located at a first end of the chamber 400, and an example flow outlet 420 located at a second end of the chamber 400. The flow inlet 410 receives air inflow 415 and the flow outlet 420 passes air outflow 425. In some examples, the chamber 400 is annularly-shaped, corresponding to the pattern of the plurality of apertures 115 such as curved or elliptical. In some examples, the chamber 400 is maintained at a negative pressure during the reclaiming and recycling operation. In other examples, the chamber 400 is maintained at a negative pressure only while applying an airflow in some airflow modes during the reclaiming and recycling operation. In the illustrated example of FIG. 6, the cross-sectional area of the chamber 400 is about 1200 mm$^2$ (e.g., 30 mm×40 mm). In some examples, the cross-sectional area of the chamber 400 is greater than about 1200 mm$^2$ or is less than about 1200 mm$^2$.

In some examples, the arrangement of the plurality of apertures 115 and/or the shape of the chamber 400 may be different than the example illustrated in FIG. 2. For instance, by way of example, the plurality of apertures 115 and the chamber 400 may be arranged in a linear, curvilinear, serpentine, circular and/or semicircular shape. Likewise, the arrangement of the plurality of protrusions 120 may be arranged depending on the arrangement of the plurality of apertures 115. Generally, each protrusion of the plurality of protrusions 120 is located near an aperture of the apertures 115 so that chunks of build material are broken up and able to enter the plurality of apertures 115. The flow inlet 410 and the flow outlet 420 may include any manner of mechanical connector such as, but not limited to, a push on hose fitting, a barbed hose fitting, a bayonet type coupler, a quick connect coupler, a male connector or a female connector. In some examples, a plurality of chambers 400 may be provided with a corresponding plurality of flow inlets 410 and flow outlets 420. For example, the chamber 400 may include a first chamber having a first flow inlet and a first flow outlet and a second chamber having a second flow inlet and a second flow outlet, with each of the first chamber and the second chamber being aligned with a corresponding first set of a plurality of apertures and a second set of a plurality of apertures.

Figure 7:
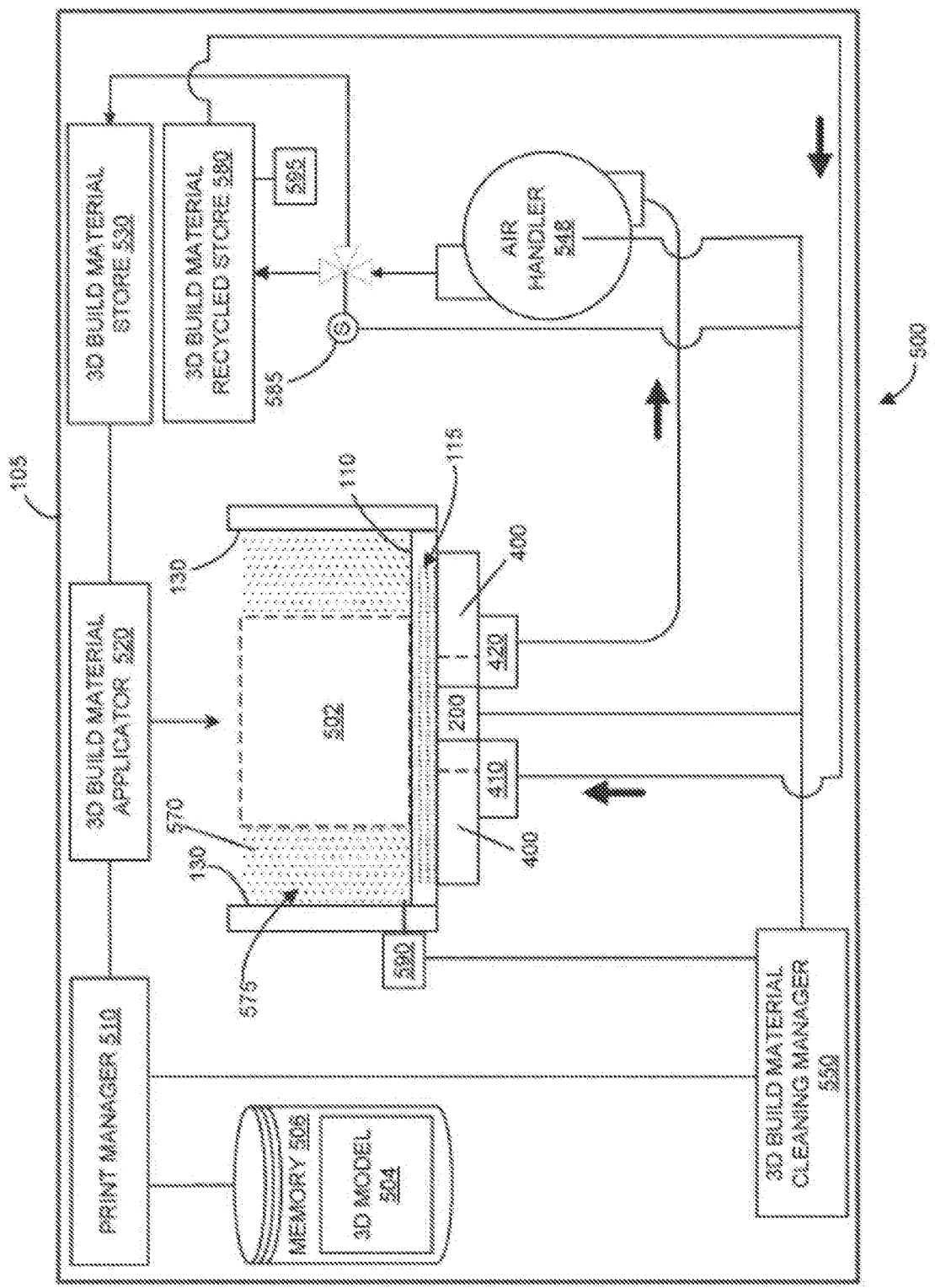
FIG. 7 is a block diagram of an example build unit to reclaim build material.

FIG. 7 is a block diagram of an example build unit 500 to reclaim build material. The flow inlet 410, the flow outlet 420 and the vibration generator 200 are shown to be connected to the bottom surface of the build platform 110. The build platform 110 is shown in a lowered position following completion of an example workpiece or product 502 corresponding to an example product model 504 stored in an example memory 506 operatively associated with an example print manager 510. The product model 504 may include instructions in a 3D printing file format, such as but not limited to, the 3D Manufacturing Format (3MF) Specification and Reference Guide, Ver. 1.1 (2015), including all model, material and property information to form the desired product 502 using the build unit 500.

The print manager 510 is constructed to control the 3D printing operation for the product 502 and to coordinate a movement of (e.g., lowering, raising, etc.) the build platform 110, via an actuator (not shown), and printing of the product 502 via the build material applicator 520 using one or more build materials drawn from one or more build material stores 530.

The movable build platform 110 is disposed to receive build material (e.g., a nylon powder, a glass-filled nylon powder, an acrylonitrile butadiene styrene (ABS) powder, etc.) from a build material applicator 520, which receives build material from the build material store 530. The build material applicator 520 selectively deposits a layer of build material (e.g., a layer having a thickness of between of about 30-60 microns, between about 60-100 microns, etc., with a variance of +/−3 microns) onto the build platform 110, or adjacent to the build platform 110, under the control of a print manager 510. In some examples, the 3D build material applicator 520 delivers build material to a choked-flow hopper, which forms a pile/ribbon of build material next to the build platform 110. A recoater (e.g., a roller, etc.) then spreads the build material over the build platform 110 to form a layer of build material.

After the build material is deposited in a layer across the build platform 110, selected portions of the build material are fused (e.g., selective laser sintering, selective laser melting, selective heat sintering, etc.) by a fusing element (not shown) or bonded by application of a bonding agent, in a pattern directed by the print manager 510 and corresponding to a product model 504 stored in a memory 506 operatively associated with the print manager 510. The product model 504 may include instructions in a 3D printing file format.

Following formation of a layer and bonding or fusing of selected portions of the layer in accordance with the product model 504, the print manager 510, via an actuator, incrementally moves the build platform 110 and the volume of build material in the build chamber downwardly relative to the build material applicator 520. The print manager 510 then causes the 3D build material applicator 520 to deposit another layer of build material on the build platform 110 on an upper surface of the build material (e.g., fused and unfused build material) in the build chamber. The next deposited layer is then selectively fused or bonded in a pattern directed by the print manager 510 in correspondence to the product model 504 stored in the memory 506. This process of applying a layer, bonding or fusing selected portions of the layer and moving of the build platform 110 relative to the build material applicator 520 (or vice versa) continues iteratively to build the workpiece or product 502. As the build platform 110 is lowered, lateral walls 130 form a lateral boundary about the build platform 110 to retain loose 3D build material.

The print manager 510 is also operatively associated with an example build material cleaning manager 550, which is operatively associated with the vibration generator 200 and the air handler 548. Following a completion of printing of the product 502, the print manager 510 instructs the build material cleaning manager 550 to initiate a build material cleaning operation to reclaim and recycle the unused build material 570 in the build area that does not form the printed product 502. The 3D build material cleaning manager 550 then activates the air handler 548 to establish airflow through the chamber 400 sufficient to entrain and move build material 570 entering the chamber 400 via the plurality of apertures 115 in the build platform 110. In some examples, the air handler 548 maintains airflow at a flow rate of above about 5 meters per second (m/s)(+/−0.5 m/s). The airflow rate may be fixed or variable. For instance, airflow may be implemented to drop at constant air handler power as build material is added into the airflow. In some examples, the build material cleaning manager 550 modulates airflow to ensure that the airflow is sufficient to entrain and transport the build material 570 entering the chamber 400 to avoid a buildup of build material 570 in the chamber 400. The airflow through the chamber 400 establishes in the chamber 400 an area of low pressure relative to the build chamber 575 (e.g., the area in which the product 502 is built in the build unit 500) to facilitate movement of the build material 570 from the top surface of the build platform 110 through the plurality of apertures 115 and into the chamber 400 where the reclaimed build material is collected. In some examples, the air handler 548 includes two U85HL-024KM-4 blowers, manufactured by Micronel AG of Switzerland, disposed in parallel.

In some examples, the air handler 548 applies airflow at a constant rate such as in a single mode or in various modes. For example, the air handler 548 applies airflow to the build platform 110 in a first airflow mode and a second airflow mode. In the first airflow mode, the build material on the build platform 110 is removed through the plurality of apertures 115. In the second airflow mode, the build material is moved away from the plurality of apertures 115 on the build platform 110.

In some examples, the airflow rate in the first airflow mode is greater than the airflow rate in the second airflow mode. For example, the airflow in the first airflow mode may be greater than 22 cfm, and the airflow in the second airflow mode may be less than 10 cfm. In some examples, in the first airflow mode, airflow is applied over a first period between about 1-20 seconds. Subsequent to the first airflow mode, the airflow in the second airflow mode is applied over a second period between about 1-20 seconds. In some examples, the air handler 548 pauses the application of airflow to the build platform 110 for up to about 20 seconds between the first airflow mode and the second airflow mode. In some scenarios, the duration of the pause is the same duration of the first period of the first airflow mode and/or the second period of the second airflow mode. In some examples, the air handler 548 transitions between the first airflow mode and the second airflow mode without pause.

FIG. 8A is an example of a timing cycle for the vibration and airflow of the build platform 110. In a non-limiting example, the vibration generator 200 may vibrate the build platform 110 in the single vibration mode at 55 Hz for 10 seconds then pause for 10 seconds. Simultaneously, the air handler 548 applies airflow in the first airflow mode of 24 cfm for 20 seconds, then applies airflow in the second airflow mode of 8 cfm for 20 seconds. This may be repeated in cycles. In some examples, the vibration mode occurs during the second airflow mode.

The build material moves on the build platform 110 toward the plurality of apertures 115 during the vibration mode. The plurality of protrusions 120 separate any chunks of build material near the plurality of apertures 115 so the build material fits through the apertures. The plurality of apertures 115 receive the build material. During the first airflow mode, negative pressure is present in the chamber 400 coupled to the bottom surface of the build platform 110 which creates suction in the plurality of apertures 115 so that the build material is removed via the plurality of apertures 115 and collected in the chamber 400. After a duration, such as 20 seconds, airflow is applied in the second airflow mode such as less than 10 cfm or 8 cfm. This reduces the suction as compared to the first airflow mode so that the build material being held over the aperture due to suction is released from the aperture and moves away from the aperture allowing other build material to be received by the aperture. In some examples, this occurs during the vibration mode as opposed to during a pause of the vibration generator 200.

FIG. 8B is an example of a timing cycle for the vibration and airflow of the build platform 110. In a non-limiting example, the vibration generator 200 may vibrate the build platform 110 in the first vibration mode, pause for a duration, vibrate the build platform 110 in the second vibration mode, then pause for a duration. Simultaneously, the air handler 548 applies airflow in a single airflow mode for a particular duration, then may pauses and repeat.

Referring to FIG. 7, the air handler 548 moves the entrained build material 570 from the chamber 400 to an example build material recycled store 580 and/or the 3D build material store 530 where it may be collected and reused. In some examples, an example diverter 585 is used to divert airflow from the air handler 548 to one or more destination locations. In some examples, the diverter 585 includes a movable damper or a valve (e.g., a 2-way or 3-way valve) that is manually operated and/or pneumatically-operated, motor-operated, or solenoid-operated. For example, a first position of the diverter 585 is used to direct airflow and the entrained build material 570 to the build material recycled store 580 and a second position of the diverter 585 is used to direct airflow and the entrained build material 570 to the 3D build material store 530. In some examples, the diverter 585 includes a movable damper that selectively isolates an airflow path to the 3D build material recycled store 580 or the build material store 530 and directs airflow to the other of the 3D build material recycled store 580 or the 3D build material store 530.

In some examples, the chamber 400, the plurality of apertures 115 and the plurality of protrusions 120 are omitted from the example build unit 100, 500 and, instead, the example flow inlet 410 and the example flow outlet 420 are connected to the build chamber 575 and are constructed to provide airflow within the build chamber 575 to entrain and remove unused build material 570. The removal of the unused build material 570 from the build chamber 575 via airflow through the build chamber 575 is performed in combination with (e.g., in parallel, in series, contemporaneously, simultaneously, etc.) operation of the vibration generator 200. In some examples, the flow inlet 410 includes a plurality of flow inlets 410, which may be connected to a manifold. In some examples, the flow outlet 420 includes a plurality of flow outlets 420, which may be connected to a manifold.

An example sensor 590 (e.g., level switch, image sensor, load cell, acoustic sensor, optical detector, photoswitch, etc.) is provided in or adjacent to the build chamber 575 to provide feedback to the example 3D build material cleaning manager 550 regarding a state of the example build chamber 575 during the recycling operation. For instance, the example sensor 590 is used to inform the example 3D build material cleaning manager 550 as to whether the recycling operation is complete or whether additional applications of the vibration mode or modes, and/or additional applications of the airflow mode or modes should be performed. In some examples, the sensor 590 may include a plurality of sensors of the same type. In some examples, the sensor 590 may include a plurality of sensors of a different type.

Figure 9:
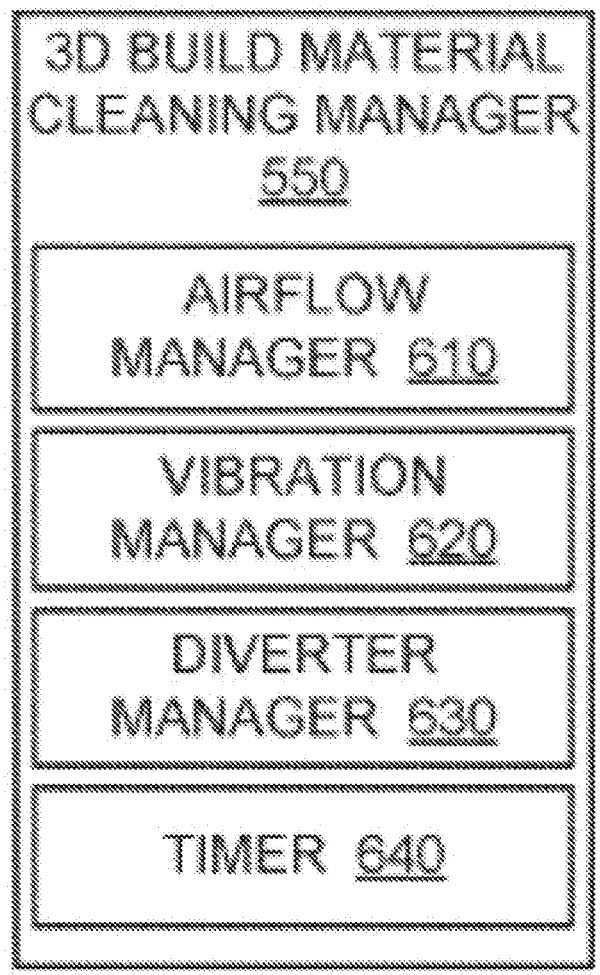
FIG. 9 is a block diagram of an example manner of implementing the 3D build material cleaning manager.

FIG. 9 shows an example build material cleaning manager 550 including an example airflow manager 610, an example vibration manager 620, an example diverter manager 630 and an example timer 640. The example build material cleaning manager 550 is operatively associated with the print manager 510 and, responsive to an instruction from the print manager 510 to start a recycling operation, the 3D build material cleaning manager 550 controls operation of the recycling operation.

The example airflow manager 610 is to control operation of the air handler 548 during the recycling operation. For instance, in some examples, the example airflow manager 610 is to regulate airflow, such as to maintain the airflow at a predetermined setting (e.g., an airflow velocity of 5 m/s, 6 m/s, 7 m/s, etc.), which may include increasing and/or decreasing power to maintain the airflow at the predetermined setting. In some examples, the airflow manager 610 is to control the airflow in correspondence to an operational mode of the vibration generator 200, such as to control the airflow the setting during the vibration mode or modes. In some examples, the airflow manager 610 is to control the airflow to a third setting during a pause between application of vibration to the build platform 110 by the vibration generator 200, such as during a pause inserted between application of the first vibration mode and the second vibrational mode. In some examples, the example airflow manager 610 and the example vibration manager 620 synchronize application of airflow via the air handler 548 with vibration via the vibration generator 200.

The example vibration manager 620 controls operation of the vibration generator 200 during the recycling operation. For instance, the vibration manager 620 controls the vibration generator 200 to apply the vibration mode to the build platform 110, the vibration manager 620 controls the vibration generator 200 to apply the vibration modes. As noted above, in some examples, the vibration manager 620 controls the vibration generator 200, in the vibration modes, to vibrate the build platform 110 at one or more frequencies in a first range of frequencies and, in the second vibration mode, to vibrate the build platform 110 at one or more frequencies in a second range of frequencies different than the first range of frequencies. In some examples, the vibration manager 620 controls the vibration generator 200, in a single mode, to vibrate the build platform 110 at one frequency. In some examples, the vibration manager 620 is operatively associated with the timer 640, which is used to govern a duration and timing of vibration applied by the vibration generator 200. In some examples, the example vibration manager is operatively associated with a graphical user interface (GUI) constructed to enable selection of vibration characteristics in the vibration modes, and in periods, if any, between the vibration modes. In some examples, a plurality of selectable options are provided via the GUI corresponding to, for example, particular characteristics of the build material or pre-defined user-settings.

The example diverter manager 630 is to control operation of the diverter 585 prior to, during or subsequent to the recycling operation. For instance, if the 3D build material cleaning manager 550 determines, via a sensor 595 (e.g., a level sensor, a weight sensor, etc.) in or adjacent the 3D build material recycled store 380 that the 3D build material recycled store 380 is nearing a full capacity, the example diverter manager 630 may actuate the diverter 585 to shift output of the recycled 3D build material 570 to the 3D build material store 530 to avoid interruption of the recycling operation (e.g., stopping the recycling operation to replace the 3D build material store 530 with an empty replacement 3D build material store 530.

The example timer 640 is to control timing of the recycling operation including operation of the vibration manager 620. In some examples, the example timer 640 is used to control the example vibration manager 620 and is not used to control the example airflow manager 610. For instance, in some examples, the example airflow manager 610 is started by the example 3D build material cleaning manager 550 at a beginning of the recycling operation and continues operation throughout the recycling operation until a sensor 590 (e.g., level switch, image sensor, load cell, acoustic sensor, photoswitch, etc.) in or adjacent the build chamber 575 is activated (or deactivated, as appropriate) indicates, such as by reaching a predetermined setting or a user-selected setting, that the build material has been removed from the build chamber 575 to a desired degree.

FIG. 9 is a block diagram of an example manner of implementing the 3D build material cleaning manager 550. One or more of the elements, processes and/or devices described herein may be combined, divided, re-arranged, omitted, eliminated and/or implemented in any other way. Further, the example airflow manager 610, the example vibration manager 620, the example diverter manager 630, the example timer 640 and/or, more generally, the example 3D build material cleaning manager 550 of FIG. 9 may be implemented by hardware, software, firmware and/or any combination of hardware, software and/or firmware. Thus, for example, any of the example airflow manager 610, the example vibration manager 620, the example diverter manager 630, the example timer 640 and/or, more generally, the example 3D build material cleaning manager 550 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example airflow manager 610, the example vibration manager 620, the example diverter manager 630, the example timer 640 and/or, more generally, the example 3D build material cleaning manager 550 is/are hereby expressly defined to include a non-transitory computer readable storage device or storage disk such as a memory, a digital versatile disk (DVD), a compact disk (CD), a Blu-ray disk, etc. including the software and/or firmware. Further still, the example 3D build material cleaning manager 550 may include one or more elements, processes and/or devices in addition to, or instead of, those illustrated in FIG. 9, and/or may include more than one of any or all of the illustrated elements, processes and devices.

Figure 10:
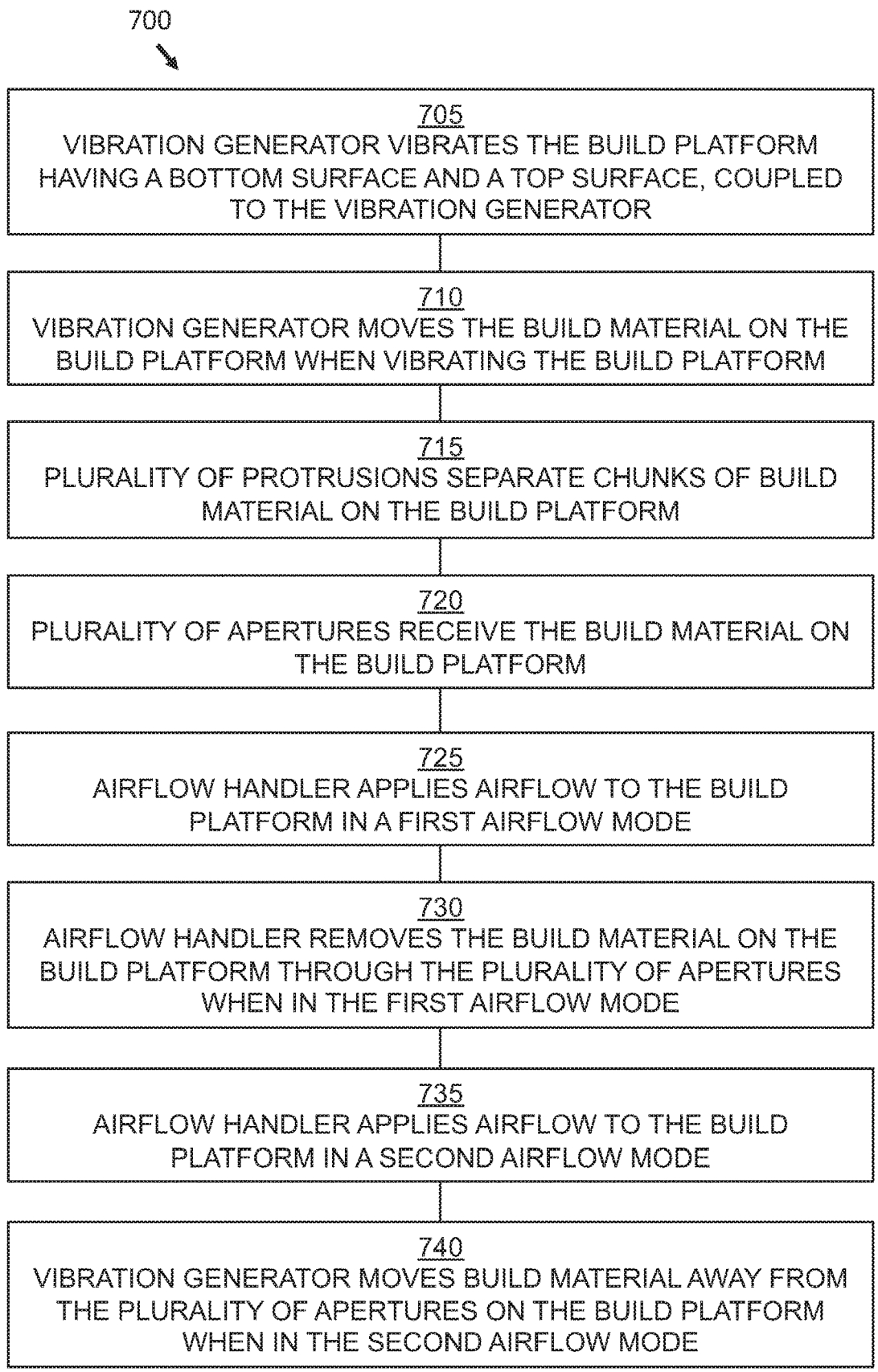
FIG. 10 is an example flowchart of a method for reclaiming and removing build material.

FIG. 10 is an example flowchart of a method 700 for reclaiming and removing build material. At block 705, the vibration generator 200 vibrates the build platform 110 having a bottom surface and a top surface which is coupled to the vibration generator 200. The build platform 110 has a plurality of protrusions 120 extending from the top surface of the build platform 110 and a plurality of apertures 115. At block 710, the vibration generator 200 moves the build material on the build platform 110 when vibrating the build platform 110. At block 715, the plurality of protrusions 120 separate chunks of build material on the build platform 110. At block 720, the plurality of apertures 115 receive the build material on the build platform 110. At block 725, the airflow handler 548 applies airflow to the build platform 110 in a first airflow mode. At block 730, the airflow handler, 548 removes the build material on the build platform 110 through the plurality of apertures 115 when in the first airflow mode. At block 735, the airflow handler 548 applies airflow to the build platform 110 in a second airflow mode. At block 740, the vibration generator 200 moves build material away from the plurality of apertures 115 on the build platform 110 when in the second airflow mode.

In some examples, some blocks of method 700 may be omitted and/or some components may be omitted. For example, for design considerations such as cost and implementation, the build platform 110 may include the plurality of apertures 115 and not the plurality of protrusions 120.

Figure 11:
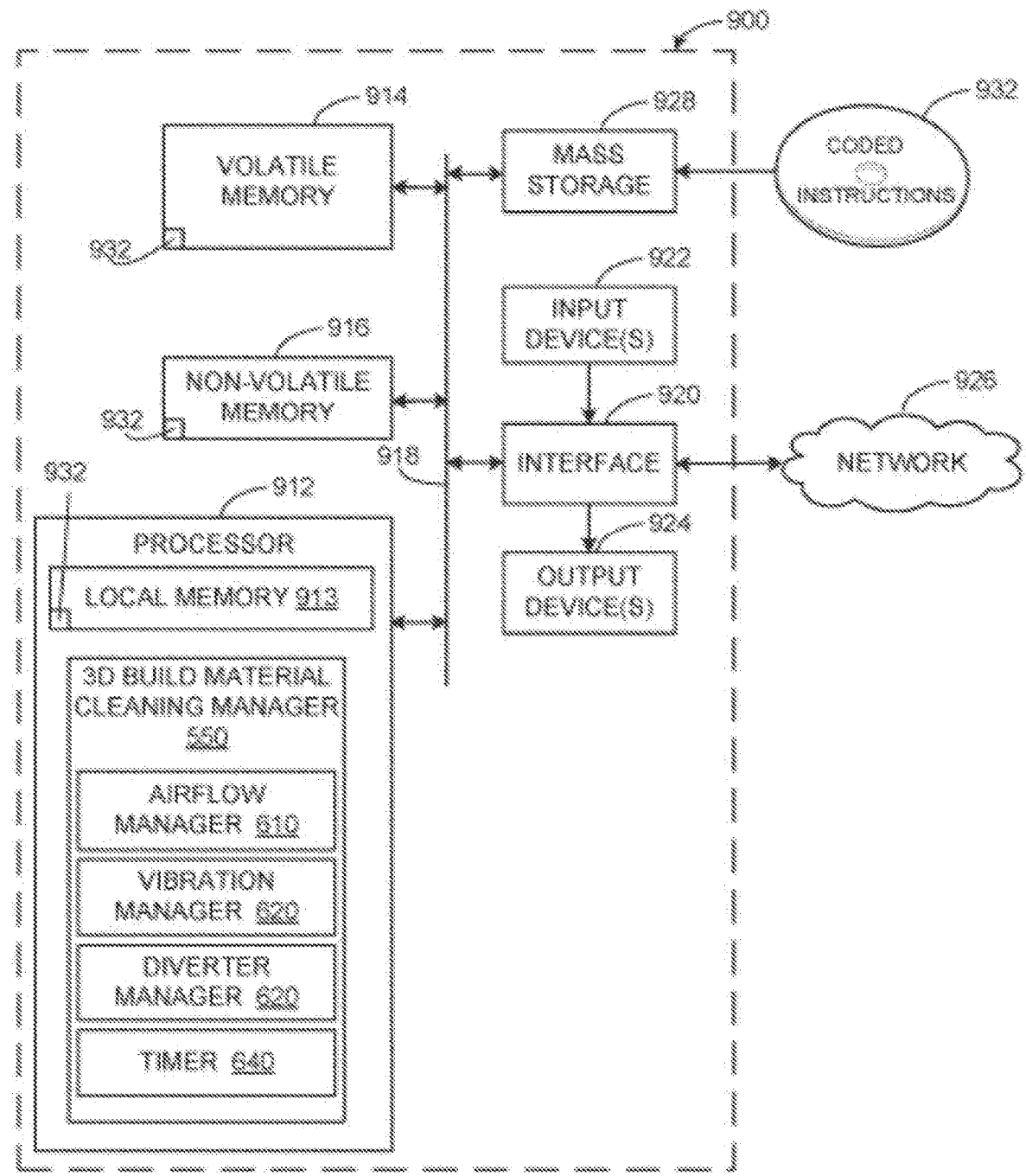
FIG. 11 is a block diagram of an example processor platform.

FIG. 11 is a block diagram of an example processor platform. The processor platform executes the example instructions of method 700. The flowchart in FIG. 10 is representative of example machine readable instructions for implementing the 3D build material cleaning manager 550. In this example, the machine-readable instructions comprise a program for execution by a processor such as the processor 912 shown in the example processor platform 900. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the method 700, many other methods of implementing the example 3D build material cleaning manager 550 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example programs of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The processor platform 900 can be, for example, a server, a personal computer, a mobile device (e.g., a cell phone, a smart phone, a tablet such as an iPad™), a personal digital assistant (PDA), an Internet appliance, a DVD player, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example 3D build material cleaning manager 550, the example airflow manager 610, the example vibration manager 620, the example diverter manager 630 and/or the example timer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 10 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that use a combination of vibrational modes with airflow modes to facilitate removal and recycling of unused build material (e.g., print powder, etc.) and efficiently clean a build chamber of the build unit. The efficient cleaning and increased recycling efficiency helps to reduce a cost-per-part cost and helps to enhance a customer experience by minimized interaction of a user with the build material.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. By way of example, the example print cleaning manager may implement various additional combinations of vibration modes such as a single vibration mode, or the first vibration mode and the second vibration mode such as, but not limited to, a sequence of two first vibration modes followed by a second vibration mode and/or a first vibration mode followed by two second vibration modes. In some examples, the vibration generator applies a plurality of cycles (e.g., two or more cycles) of the single vibration mode—at the same frequency—with durations of pauses depending on the airflow mode or mode. The vibration generator may also alternately apply a plurality of cycles (e.g., two or more cycles) of a first vibration mode and a second vibration mode, wherein one or more vibrations in the first vibration mode and/or one or more vibrations in the second vibration mode may differ (e.g., in frequency, in duration, in sequence, etc.) from one or more vibrations in the first vibration mode and/or one or more vibrations in the second vibration mode in a second cycle.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A system comprising:
   a build platform having a bottom surface and a top surface, a plurality of protrusions extending above the top surface of the build platform to separate chunks of build material on the build platform, and a plurality of apertures to receive the build material on the build platform, wherein the chunks of build material do not form a printed 3D object;
   a vibration generator coupled to the build platform to vibrate the build platform and move build material on the build platform; and
   an air handler to apply airflow to the build platform in a first airflow mode and a second airflow mode, wherein in the first airflow mode, build material on the build platform is removed through the plurality of apertures.

2. The system of claim 1, wherein each protrusion of the plurality of protrusions is spaced apart from one another and located between neighboring apertures of the plurality of apertures.

3. The system of claim 1, wherein each protrusion of the plurality of protrusions is elliptical or circular in shape.

4. The system of claim 1, wherein each protrusion of the plurality of protrusions extends approximately 2 mm from the build platform.

5. The system of claim 1, further comprising a chamber coupled to the bottom surface of the build platform and to the air handler, the chamber having a flow inlet at a first end of the chamber and a flow outlet at a second end of the chamber, the chamber being at a negative pressure while applying the airflow in the first airflow mode.

6. The system of claim 1, wherein the airflow in the first airflow mode is greater than 22 cfm, and the airflow in the second airflow mode is less than 10 cfm.

7. The system of claim 1, wherein the first airflow mode and the second airflow mode are the same duration.

8. A method comprising:
   vibrating, by a vibration generator, a build platform having a bottom surface and a top surface, and coupled to the vibration generator, the build platform having a plurality of protrusions extending above the top surface of the build platform and a plurality of apertures;

moving, by a vibration generator, build material on the build platform when vibrating the build platform;

separating, by the plurality of protrusions, chunks of build material on the build platform, wherein the chunks of build material do not form a printed 3D object;

receiving, by the plurality of apertures, the build material on the build platform;

applying, by an airflow handler, airflow to the build platform in a first airflow mode;

removing, by the airflow handler, the build material on the build platform through the plurality of apertures when in the first airflow mode; and applying, by the airflow handler, airflow to the build platform in a second airflow mode.

9. The method of claim 8, wherein a chamber is coupled to the bottom surface of the build platform and the air handler, the chamber having a flow inlet at a first end of the chamber and a flow outlet at a second end of the chamber, the chamber being at a negative pressure while applying the airflow in the first airflow mode.

10. The method of claim 8, wherein each protrusion of the plurality of protrusions is spaced apart from one another in a non-repeating pattern.

11. The method of claim 8, wherein each protrusion of the plurality of protrusions extends approximately 1.5 mm to 3 mm from the build platform.

12. The method of claim 8, wherein the airflow in the first airflow mode is greater than the airflow in the second airflow mode.

* * * * *